L. K. FULLER.
Ventilators and Dust-Arresters.
No. 131,266. Patented Sep. 10, 1872.
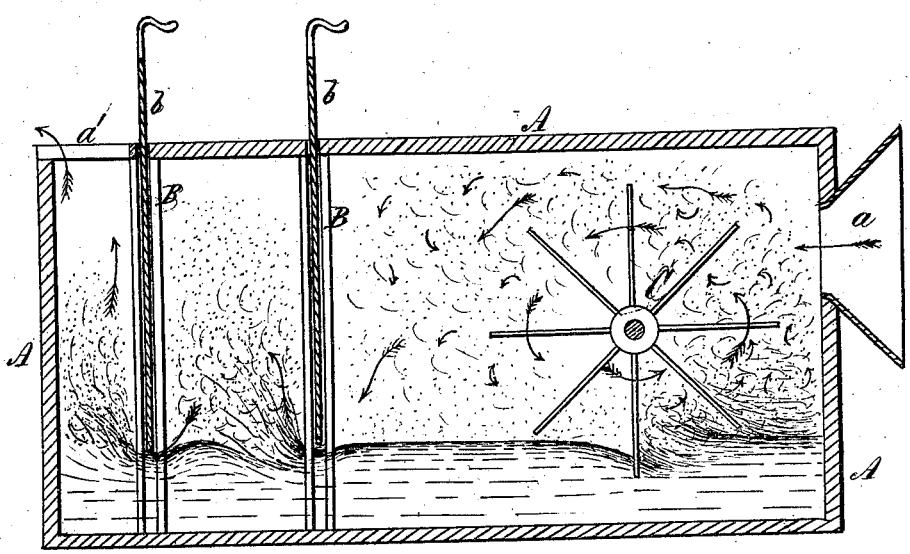

UNITED STATES PATENT OFFICE.

LEVI K. FULLER, OF BRATTLEBOROUGH, VERMONT.

IMPROVEMENT IN VENTILATORS AND DUST-ARRESTERS.

Specification forming part of Letters Patent No. 131,266, dated September 10, 1872.

SPECIFICATION.

*To all whom it may concern:*

Be it known that I, LEVI K. FULLER, of Brattleborough, in the county of Windham and State of Vermont, have invented certain new and useful Improvements in Ventilators and Dust-Arresters, of which the following is a description:

My invention has for its object the purification and refrigeration of a current of air when passed through a spray; and it consists of an apparatus formed of a closed water-chamber divided by partitions into two or more compartments, in which is arranged a spray-wheel or agitator, the said partitions being provided with slides to regulate the water, apertures being formed for the entrance and exit of a current of air, so arranged that it cannot escape without being subjected to a thorough admixture with the spray, by which it is deprived of dust and other impurities.

In the drawing, the figure is a longitudinal section of my apparatus provided with adjustable partitions.

The box or chamber A may be of any suitable size and shape, and is closed on all sides except the induction and eduction apertures $a$ and $a'$ for the admission of a current of air and its exit after having been deprived of its dust and cooled. The bottom of this chamber is filled with water to a suitable depth—say, one-third of its capacity, or thereabout. A spray or agitating wheel, C, on a spindle extending through the side of the box, so that power may be applied externally to rotate it, if it should ever be found necessary, is so situated in relation to the water that its vanes or paddles dip below the surface in their rotation, breaking the liquid into spray, which fills the compartment in which the wheel is situated. Across the box, and between the induction and eduction openings $a\ a'$ are one or more partitions, B B, extending from the top to the bottom of the case, or nearly so, said partitions being provided with slides $b\ b$, which admit of being adjusted to the surface of the liquid in the chamber, the height of which will be dictated by judgment of the user. The purpose of these partitions is to cause the air to pass, before escaping, in close contact with the water and thereby deposit any particles of dust or other matter not previously separated and cool it. The wheel C is situated in such relation to the inlet $a$ that the inflowing draft of air strikes it either above or below its axis, causing it to revolve rapidly and agitate and atomize the liquid and establish a continuous circuit of spray and saturate the air contained in the chamber, subjecting all parts of it to the action of a "rain-fall" or cloud of spray, and washing or separating from it all particles of solid matter and dissolving such impurities as are soluble in water, as carbonic acid and other gases, rendering it pure and fit for respiration. The ready adjustability of the slides enables the spaces intervening between them and the surface of the water to be nicely graduated to the force or volume of the air which is allowed to pass through the apparatus, on which its effective and perfect operation, in a great measure, depends.

This apparatus is adapted to the purification of air admitted to dwellings and manufactories, where dust and other impurities prevail, and to the ventilation of railway cars, and to the ventilation of dust-houses, by permitting the air to escape, while retaining all the dust within, being simple, inexpensive, and certain in its operation.

What I claim as my invention is—

A ventilating apparatus, consisting of the chamber A provided with the induction and eduction orifices $a\ a'$, spray-wheel C, and one or more partitions B B and slides $b\ b$, arranged and operating substantially as and for the purpose specified.

In witness whereof I have hereunto signed my name in the presence of two subscribing witnesses.

LEVI K. FULLER.

Witnesses:
   W. H. CHILDS,
   N. P. CHASE.